United States Patent [19]

McCafferty

[11] Patent Number: 4,606,368
[45] Date of Patent: Aug. 19, 1986

[54] BALL VALVE FOR PIPELINE

[75] Inventor: John J. McCafferty, Coalpit Heath, England

[73] Assignee: Forsac Valves Limited, Edinburgh, England

[21] Appl. No.: 632,843

[22] Filed: Jul. 20, 1984

[30] Foreign Application Priority Data

Jul. 22, 1983 [GB] United Kingdom ............... 8319853

[51] Int. Cl.⁴ .................. F16K 43/00; F16K 5/06; F16K 25/00
[52] U.S. Cl. .................................. 137/15; 137/315; 137/454.2; 137/454.6; 251/172; 251/175; 251/180; 251/315; 251/316
[58] Field of Search .................... 137/15, 315, 454.2, 137/454.5, 454.6; 251/315, 316, 317, 172, 175, 176, 180

[56] References Cited

U.S. PATENT DOCUMENTS

| | | | |
|---|---|---|---|
| 3,100,501 | 8/1963 | Hansen et al. | 251/361 |
| 3,107,685 | 10/1963 | Scaramucci | 137/327 |
| 3,150,681 | 9/1964 | Hansen et al. | 251/315 |
| 3,179,121 | 4/1965 | Bredtschneider et al. | 137/454.6 |
| 3,682,439 | 8/1972 | Neto | 251/315 |
| 3,920,036 | 11/1975 | Westenrieder | 137/315 |
| 3,934,606 | 1/1976 | Matthews | 137/454.6 |

FOREIGN PATENT DOCUMENTS

| | | |
|---|---|---|
| 32038 | 7/1981 | European Pat. Off. |
| 1093157 | 11/1960 | Fed. Rep. of Germany |
| 1223211 | 8/1966 | Fed. Rep. of Germany |
| 7122352 | 9/1971 | Fed. Rep. of Germany |
| 1750172 | 9/1977 | Fed. Rep. of Germany |
| 2650803 | 12/1977 | Fed. Rep. of Germany |
| 1274893 | 9/1961 | France ........................ 251/315 |
| 1304723 | 12/1962 | France |
| 1515229 | 9/1968 | France |
| 1577027 | 6/1969 | France |
| 259337 | 10/1926 | United Kingdom |
| 818646 | 8/1959 | United Kingdom |
| 936686 | 9/1963 | United Kingdom |
| 987906 | 3/1965 | United Kingdom |
| 1216138 | 12/1970 | United Kingdom |
| 1225567 | 3/1971 | United Kingdom |
| 1318252 | 5/1973 | United Kingdom |
| 1465472 | 2/1977 | United Kingdom |
| 2037952A | 7/1980 | United Kingdom |
| 2073376A | 2/1981 | United Kingdom |
| 2061464A | 5/1981 | United Kingdom |

*Primary Examiner*—G. L. Walton
*Attorney, Agent, or Firm*—Larson and Taylor

[57] ABSTRACT

A ball valve assembly comprising: a body providing a socket and flow ports communicating therewith; and a core unit comprising a core assembly adapted to be releasably inserted into said socket, the core assembly having a through passage arranged to communicate with said flow ports, and a rotatable ball member within the core assembly, said member having a through passage such that rotation moves it into and out of communication with the passage in the core assembly.

5 Claims, 10 Drawing Figures

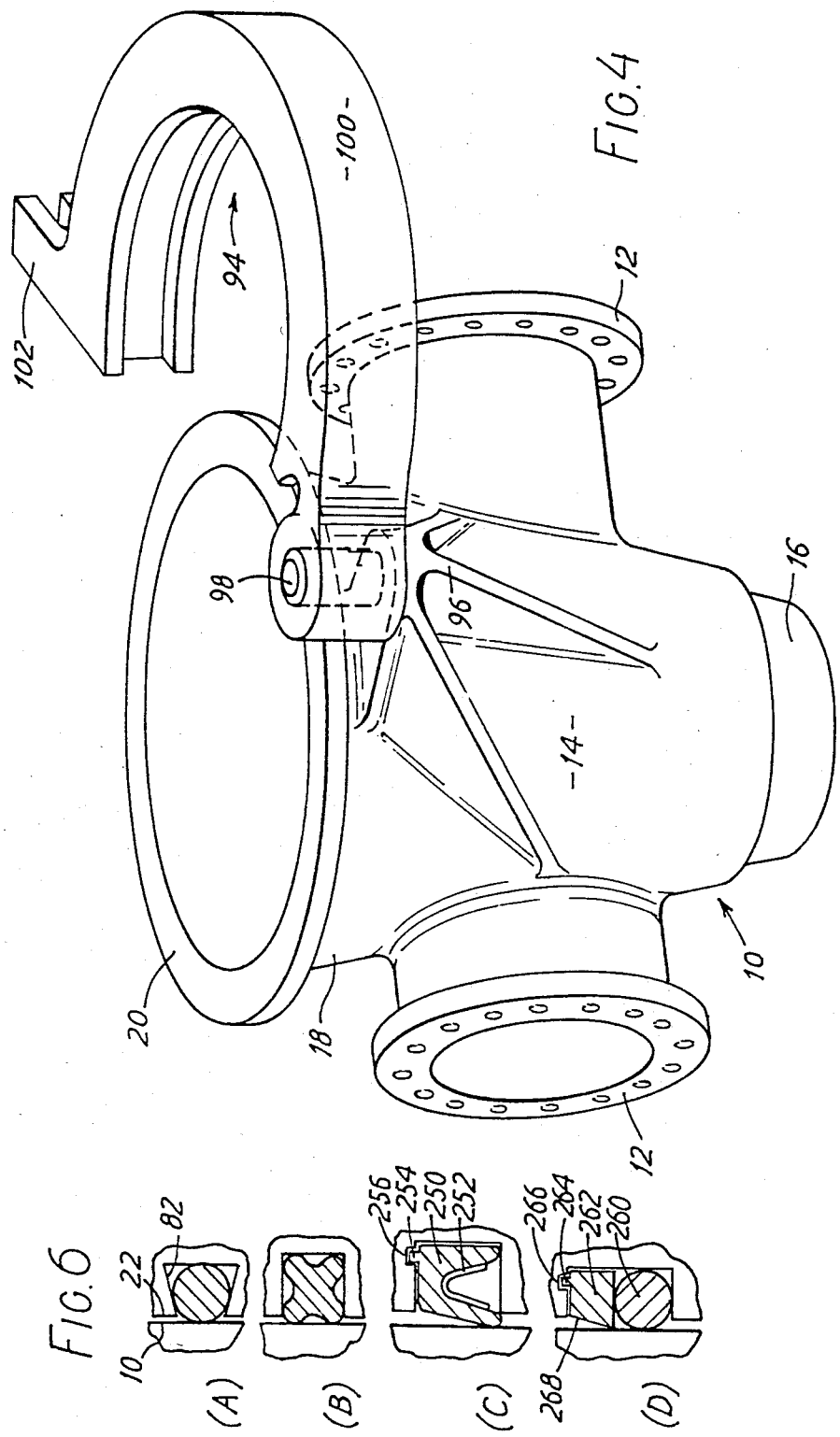

BALL VALVE FOR PIPELINE

BACKGROUND OF THE INVENTION

The present invention relates to a ball valve assembly which can be made sufficiently large and robust to be installed in a pipeline, particularly an undersea oil pipeline. It may also be applied on a smaller scale.

A ball valve has a body with a through passage, and a rotatable ball member located in the body. The ball member has a through passage, and may be rotated between an "open" configuration. in which its through passage is in line with the through passage of the body, and a "closed" configuration in which the two through passages are no longer in register. The rotation of the ball member is generally effectable about a single axis transverse to the through passage of the body.

This general type of valve has been found to be the most suitable for use under arduous conditions such as in undersea oil pipelines, where large pressures are involved. In the known type of assembly, the body is closed by a bonnet which is secured by a multiplicity of bolts. It is periodically necessary to service the valve, particularly to repair or replace the seals. This requires a team of divers to descend to the seabed, and to remove the bonnet after undoing the bolts (which are likely to be severely corroded). Even after the bonnet has been removed, the operation is difficult. It is quite likely that the pipeline will have to be shut down for a period of two or three weeks. The costs involved are very substantial, e.g. of the order of £200,000 (Sterling).

SUMMARY OF THE INVENTION

According to the present invention in a first aspect, there is provided a ball valve assembly comprising a core unit adapted to be releasably inserted in a complementary body in a pipeline, the core unit comprising a core assembly having a through passage for a flow in the pipeline, and a ball member to berotatably mounted within the core assembly and having a through passage such that rotation moves it into and out of communication with the passage in the core assembly; whereby the core unit can be removed from the pipeline and replaced by a like unit. Preferably the core unit includes seals for sealing to the body, which need only provide suitable surfaces for sealing contact, all the replaceable parts being in the core unit.

Preferably, the core unit is tapered to fit a tapered socket provided by the body. The mating surfaces may be frustoconical. There may be annular seals retained in grooves in the conical surface of the core unit.

The core unit may be retained in the body by a bonnet having a peripheral flange arranged to overlie a like flange associated with the body and to be releasably clamped thereto by a circumferential clamp which holds the two flanges together and can be moved away after release at a single location. For example, a manacle clamp may consist of two (or more) pivotally connected sections pivotable to define a circular collar of inwardly opening channel section for embracing the flanges; the end portions of the end sections being connectable together.

The core assembly may be in two parts, separable to permit removal of the ball member (after removal from the body).

The sealing between the ball member and the core assembly may employ a floating annular seal, attached neither to the ball member nor the assembly, so as to be self-centering on the ball member. There may be camming means associated with the ball member and seal to lift off the seal on rotation of the ball member. The seals may be arranged so that fluid pressure within the through passages urges sealing contact. There may be spring means for enhancing sealing at low fluid pressure.

In another aspect the invention provides a pipeline portion comprising a body and a core unit.

In a third aspect the invention provides a method of repairing or servicing a pipeline portion which includes a said ball valve assembly, which method comprises unplugging the core unit and inserting a replacement.

BRIEF DESCRIPTION OF THE DRAWINGS

FIG. 4 is a perspective view of the body after removal of the core unit;

FIG. 5 is a detail of a view similar to FIG. 2 showing a modified seal arrangement;

FIGS. 6A to D are views of seal types; and

DESCRIPTION OF THE PREFERRED EMBODIMENTS

Figure 1:
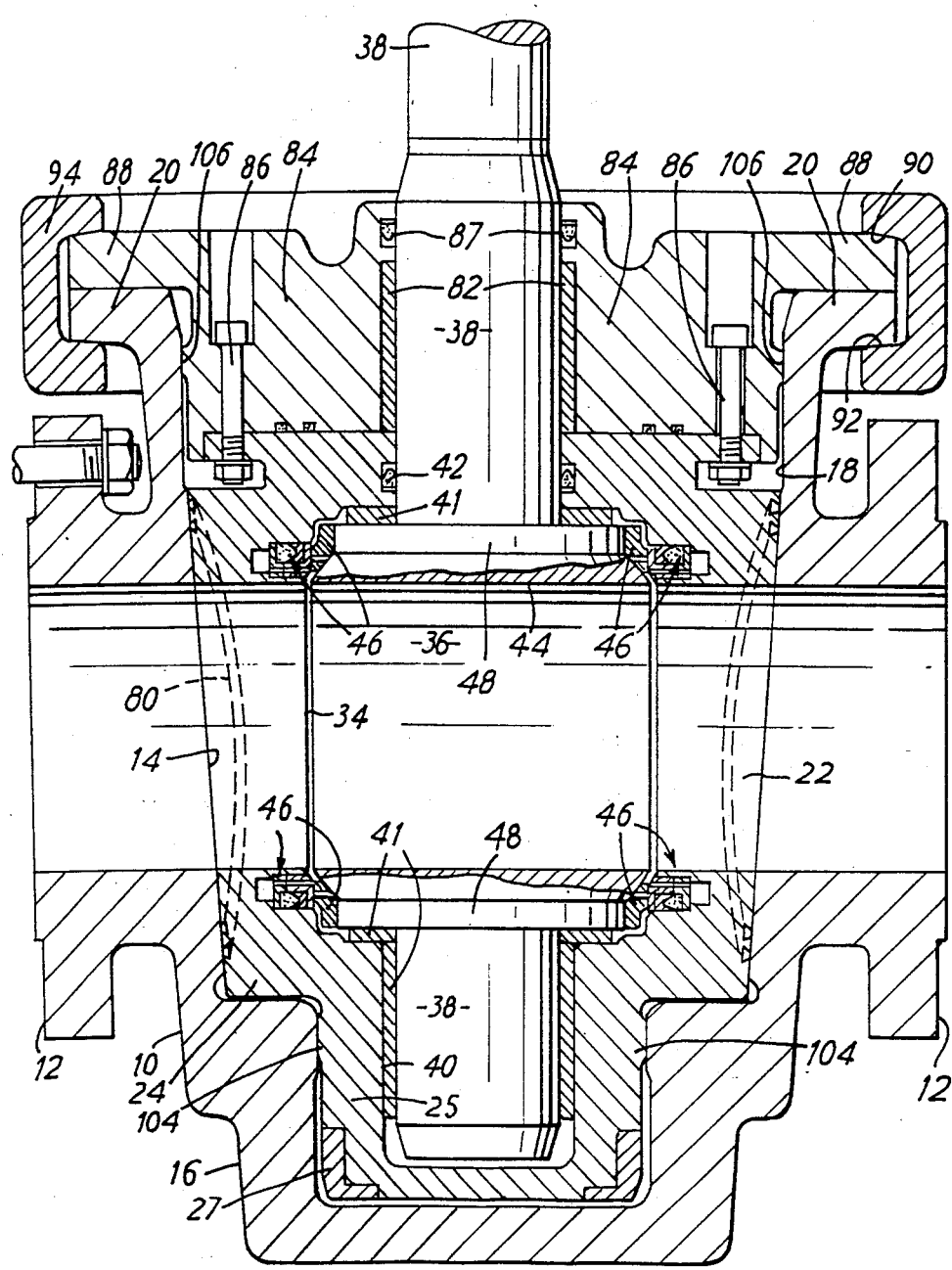
FIG. 1 is a longitudinal section through a ball valve assembly embodying the invention.

Referring to FIGS. 1 to 4, the body 10 has, at upstream and downstream ends, flanges 12 for use in coupling lengths of pipeline. (Of course, other means of connection—e.g. welding—could be used.) Between these connecting flanges 12 the body 10 defines a generally conical chamber 14 whose axis is transverse to the axis of the pipeline, and will generally be vertical. The conical chamber 14 is closed at the bottom by a cylindrical cup portion 16. It is open at the top, where there is a generally cylindrical portion 18 and a peripheral flange 20 which projects radially outwardly.

The valve core 22 comprises a generally frustoconical main portion 24 shaped and dimensioned so as to fit within the conical chamber 14 . A lower, generally cylindrical, portion 25 extends into the cup portion 16 and seats on an annular damper 27. The core's main portion 24 has a through passage 26.

The valve core 22 is formed of two like portions, the join being substantially in an axial plane. To ensure sealing, the abutment faces may be coated with an inert sealant material. Adjacent the join line the frustoconical body portion 24 has pairs of scalloped recesses 28, the two recesses 28 of each pair being located on either side of the join line and connected by a through bore. Bolts 30 pass through the bores and receive nuts 32 on their free ends, for holding together the two halves of the core 22.

Internally, the valve core 22 has a valve chamber 34 for receiving a ball member 36. Portions of a shaft 38 extend axially above and beneath the ball member 36. They are formed with it as a unitary drop-forging, so there will be no problems due to crevice corrosion. The lower portion extends into a bearing cavity 40 in which it is journalled. Above the chamber 34, the shaft 38 extends above the valve core 22 (via a seal 42) and above the body 10. The ball member 36 is rotatable in the valve chamber 34 by means of the shaft 38. There are bearing surfaces 41 on the axial end walls of the valve chamber 34 and on the cylindrical wall of the cavity 40.

The ball member 36 has a through passage 44, of large circular cross-section similar to that of the through passage in the valve core 22. Rotation of the ball member 36 by quarter of a turn opens or closes the valve by moving the through passage 44 between an open configuration in which it is in line with the through passage 26, and a closed configuration in which the through passage 44 of the ball member 36 is perpendicular to the through passage 26 of the valve core 22, so that it is closed by the wall of the valve core.

Figure 2:
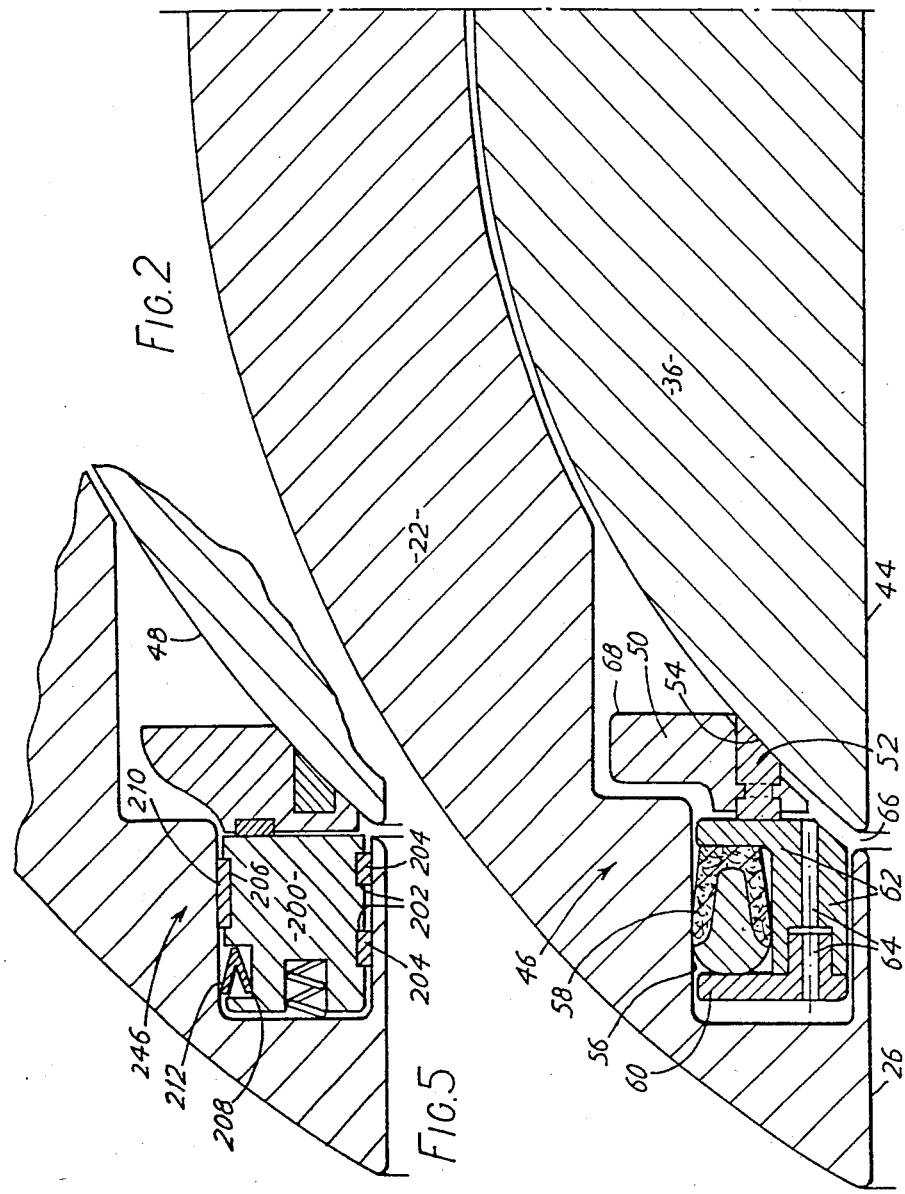
FIG. 2 is an enlarged detail of FIG. 1, showing a sealing assembly for the ball member.

At either side of the ball member 36 there are respective annular seal means 46 which, when the ball member 36 is in its open configuration, surround the mouths of the through passage 44. On either side of the through passage 44, and adjacent the seal means 46, there are respective annular cam surfaces 48 for cooperating with the seal means 46. Referring to FIG. 2, which shows a seal means 46 in greater detail, it can be seen that the seal means 46 includes a seal ring 50. This is of a hard material, such as stainless steel or an inert hard plastic. It serves to hold and support a softer insert 52. This is still quite hard, owing to the high pressures to which it is likely to be subjected, and the need to avoid creep. Thus, it may, for example, be made of PTFE or nylon. It has a sealing surface 54 which is concave and arranged and dimensioned for abutting the spherical surface of the ball member 36. The seal ring 50 and insert 52 are not attached either to the ball member 36 or the valve body 22, but instead float. Thus the sealing surface 54 can be urged sealingly against the ball member 36, without there being serious problems of maintaining concentricity of the seal. The seal ring 50 abuts the cam surface 48 on rotation of the ball member 36.

A further portion of the seal means 46 is located largely within an annular cavity 56 in the valvecore 22, opening towards the ball member 36. There is a further annular seal ring 58 located in a chamber defined on the radially outer side by the outer wall of the annular cavity 56, and on the other sides by two seal housing members 60,62, which engage together so as to be relatively slidable in the axial direction of the annular cavity 56 and seal 58. This is to allow for the variation in size of the seal ring 58 with varying stresses. One of the housing members 62 is in contact with an end portion of the insert 52 associated with the other seal ring 50. At the other axial side of the annular cavity 56, the other housing member 60 abuts a resilient means, suitably a disc spring e.g. of Bellville washer type, located within the cavity 56. Thus the housing member 60 is urged to compress the seal ring 58 and the insert 52. The housing members 60,62 are penetrated by axial bores 64 to communicate the region of the cavity 56 beyond (axially outward of) the housing members 60,62 with the through passages 26 and 36, via a gap 66 between the housing member 62 and the ball member 36. Thus liquid under pressure in the through passages is conducted to the rear of the housing member 60, to urge it to enhance sealing. There may be a wiper seal (not shown) in the gap 66 to exclude sand and detritus, which might otherwise get between the seals and the surfaces against which they should seat.

Part of an alternative seal means 246 is shown in FIG. 5. Instead of the housing members 60,62 there is a single annular piston 200, which may be of metal. Its cross-section is substantially rectangular, with two annular cavities 202, in the radially inner side containing bearings 204, and two annular cavities 206,208 in the radially outer side The cavity 206 on the axially inner side contains a bearing 210. The outer cavity 208 contains a sealing ring 212. This is preferably a spring energised PTFE seal. The three bearings 204,210 prevent metal-metal contact, and allow the pressure medium (generally oil from the pipeline) to pass, but not sand and grit, which might damage the sealing ring 212. Some pressure medium will get past the seal means 246, into the body cavity between the ball member 36 and the core 22. If the pressure in the pipeline is released, there is a tendency for this "escaped" medium to remain at high pressure, which could be dangerous. However, the preferred seal arrangement has the ring 212 arranged to act like a valve, resisting strongly the outward passage of oil but allowing its return easily. Thus the "body cavity relief pressure" is very low.

The seal means 46 or 246 are required to function primarily when the ball member 36 is in its open configuration. They are generally urged forcefully into sealing contact, which tends to make it difficult to turn the ball member 36. To reduce this problem, there may be a cam surface 48 as shown. This is arranged to interact with the axial end face 68 of the seal ring 50, so that as the ball member 36 begins to turn, the seal ring 50 is moved away from it (to the left in FIG. 2), so that the sealing surface 54 is lifted off the ball member 36. This condition may persist until the ball member 36 returns to the open configuration. Alternatively, the cam may be shaped so that the sealing surface 54 moves back into contact in a closed configuration of the ball member 36 after it has turned through a predetermined angle.

In addition to the sealing between the ball member 36 and the valve core 22, there are seal means 80 between the valve core 22 and the body 10. These principally comprise resilient O-rings in annular grooves on the valve core 22. However, the shape of the surface of the valve body 22 is rather complicated, being part of the surface of a cone. Thus, in use, the O-rings are not planar. They therefore tend to become unseated from the grooves. To resist this, the grooves 82 may be formed not with simple U-sections, but with sections having narrowed mouths, at least over part of their extent. (A less favoured alternative would be to use simple grooves 82 and to adhere the rings in place. Of course, both methods of retaining the rings could be used.) We may use grooves 82 having a dovetail section (FIG. 6A).

In fact, we have found that such complex grooves can be avoided. If a conventional seal (O-ring or quadrate: FIG. 6B) is of such an intrinsic size that it must be stretched (e.g. by 2%) to fit the groove, its resilient force suffices to keep it in place.

For use in severe conditions, a spring-energised PTFE seal is preferred. As shown in FIG. 6C, this has a PTFE body 250 (which may be loaded with glass or carbon) with a cross-section in the form of a "U" with diverging arms. These are urged apart by a metal spring 252 of an alloy resistant to sour gas. The base of the "U" has an annular nib 254. This seal fits in a groove having a recess 256 for receiving the nib 254. One arm of the "U" abuts the body of the pipeline portion 10. With a conventional seal ring, if high pressures are to be withstood it is essential that the gap between the core 22 and the body 10 should be small (e.g. under 75 $\mu$m), or the seal is likely to be extruded out through the gap. A seal as shown in FIG. 6C can be used with a much larger gap, e.g. 450 $\mu$m. It is also extremely resistant to "sour gas" (containing H₂S) and other corrosive media, which tend to attack conventional seals. There is little or no risk of explosive decompression.

For even more arduous conditions (such as high temperatures) a seal ring similar to that shown in FIG. 6C but made of PTFE-coated metal (spring-energised) may be used.

If the resistance to blow-out at high pressures and large gap-sizes is required, but the corrosion-resistance of PTFE is not necessary, the arrangement of FIG. 6D may be employed. This uses a conventional O-ring 260 (or, e.g., a quadrate ring) radially inwardly of a retainer ring 262. The ring 262 has a nib 264 received in a recess 266, as in FIG. 6C. Its exposed outer face 268 is angled so as to bridge the gap and abut the pipeline body 10 adjacent the O-ring 260. It is of a fairly hard material with a degree of resilience, e.g. PTFE.

Generally, energised PTFE seals are preferred for all sealing in the ball valve assembly.

A bonnet 84 is fast with the valve core 22, being secured to it by means of bolts 86. The shaft 38 of the ball member 36 passes rotatably through the bonnet 84, via a cylindrical bearing surface 85 (which is non-metallic, to avoid electrolytic action) and a seal 87 whose principal purpose is to keep seawater out. The seal may employ a sealing ring of nitrile rubber or, more preferably, of spring energised PTFE. The bonnet 84 has a peripheral flange 88 dimensioned to overlie the flange 20 of the body 10. The flanges 88 and 20 have respective upper and lower bevelled surfaces 90,92 which together define a wedge. They can be clamped together by means of a manacle clamp 94, one half of which is shown schematically in FIG. 4. As seen there, the body 10 is formed externally with a support bracket 96 bearing an upwardly directed pivot 98 on which is journalled one half of the clamp 94. This has an approximately semi-circular arm portion 100 having a radially inwardly directed channel section. At the distal end, the arm portion 100 has a clamping portion 102. The two portions 100 can be swung together about the pivot 98 so that their clamping portions 102 are near one another. The wedge defined by the bevelled surfaces 90,92 is then received partly within the complementary channel section of the arms 100. Further drawing together of the arms 100, e.g. by means of a nut and bolt passing through the clamping portions 102, forces the flanges 20,88 tightly together by the wedging action. Thus the bonnet 84 can be held on firmly by means of a single bolt, or other type of fixture, e.g. a quick-release fastener. (The clamp 94 need not be pivotted to the pipeline portion. Release could then free it.)

When the valve is closed, the pressure of fluid in the pipeline may provide a very large force on the valve assembly. This force could be ultimately borne by the plurality of bolts which hold down the bonnet. However, preferably, as in the illustrated embodiment, the force is taken by load-bearing surfaces fast with the valve core 22. One of these is provided by an annular thickening 104 on that lower, cylindrical portion 25 of the valve core 22 which projects into the cylindrical cup portion 16 of the body 10. (The surface could alternatively be provided on a separate clamp member.) Another is provided by a similar thickening 106 on the bonnet 84, spaced some way beneath the flange 88 thereof.

In use, when it is required to repair or service some parts of the valve assembly, it is merely necessary to undo the simple means holding the manacle clamp shut. (This preferably involves a simple overcentering cam arrangement, with no bolts which are liable to corrosion.) Then the unitary assembly of bonnet 84, valve core 22, and ball member 36 can simply be lifted out, and immediately replaced by another unit. The removed unit can be taken to a convenient location for servicing. The time for which the pipeline is out of operation is very much reduced as compared with conventional systems. The replacement unit slips into the conical socket in the body 10 simply, and accurate location is given by the sealing means 80. The manacle clamp is then swiftly secured. The removed unit may be repaired on the ship or ashore. The bonnet 84 may be removed by undoing the bolts 86. The valve core 22 may be taken apart by undoing the bolts 30, and the ball member 36 can then be attended to, and the seal means 46 repaired. The removable unit includes all of the components (such as seals) which are likely to need repair or replacement. The pipeline portion, which remains on the sea bed, provides only simple mating and sealing surfaces.

It will be appreciated that the above described assembly has numerous features which may be useful in contexts other than that described. We would particularly point out the ingenious nature of the seal means 46 and 246, e.g. using the floating ring 50, the cam surface 48 and the displaceable housing members 60,62 which are arranged to be urged to enhance sealing both by means of springs and by the pressure of the fluid within the pipeline. This latter "double urging" feature means that good sealing can be assured at relatively low pressures (when the disc springs are effective) and at higher pressures, since the sealing force automatically rises in step with the fluid pressure. This is to be contrasted with prior art sealing means, which could generally work well at only one end of the pressure range.

The cam surfaces 48 may be provided by separate cam elements (here rings) which are removably located on the ball member. They can be removed for servicing or replacement, e.g. to alter the camming action. Thus it might be desired to alter the turning angle over which sealing contact is maintained, or to cause the sealing surfaces 54 to lift off only at one (upstream or downstream) side.

It may be pointed out that friction with the seals is normally a major cause of wear in ball joints; and this is much ameliorated by our use of camming. This may be applied to many types of valve.

The seals 46,80 which surround the through-passage are radially outside it. Thus the pipeline, including the valve assembly, can be cleaned by pigging without risk to the seals.

Figure 3:
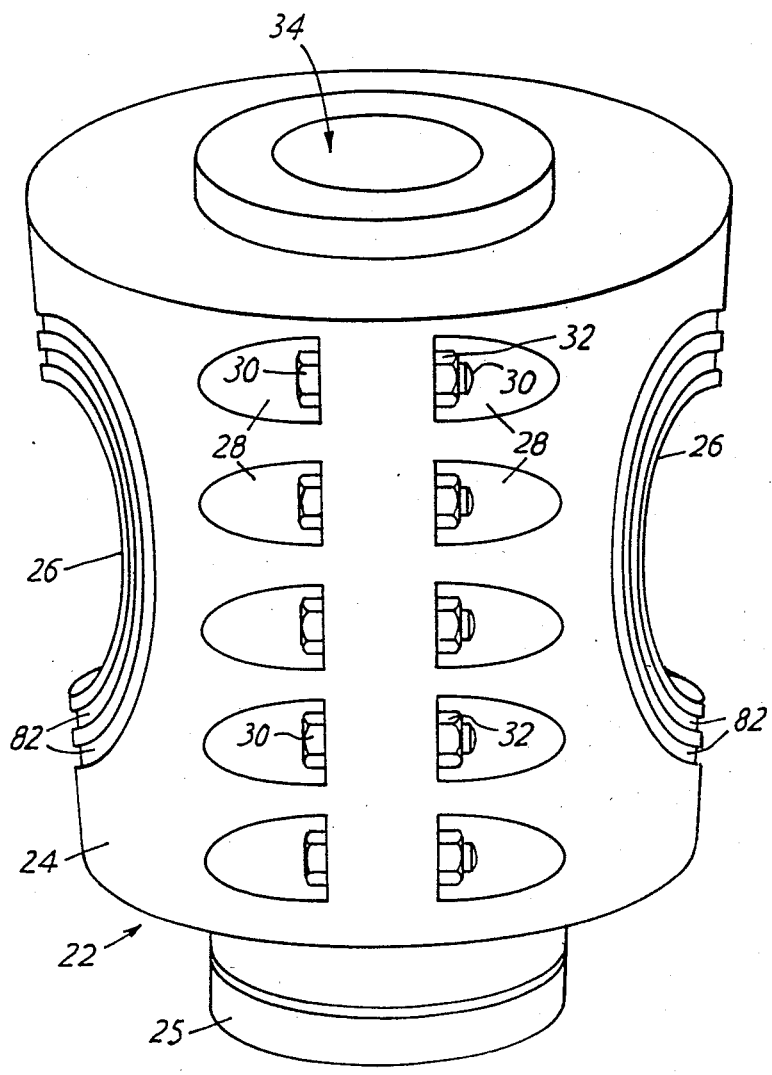
FIG. 3 is a perspective view of the core unit.

As shown in FIG. 3, the halves of the valve core 22 are held together by bolts 30 in recesses 28 in the body portion 24. The cylindrical upper and lower (25) portions have no provision for holding means (except that the upper portion is secured to the bonnet 84 by bolts 86). A constructional form which can provide greater strength involves providing upper and lower peripheral flanges, similar to the flange 20 of the pipeline portion 10. The valve body 22 is then secured to top and bottom bonnets or caps which have complementary flanges. These may be held releasably in place by manacle clamps (operating much like the clamp 94), or by means of bolts. The lower load-bearing surface may be provided by the bottom cap, instead of by a thickening 104 integral with the body 22.

Figure 7:
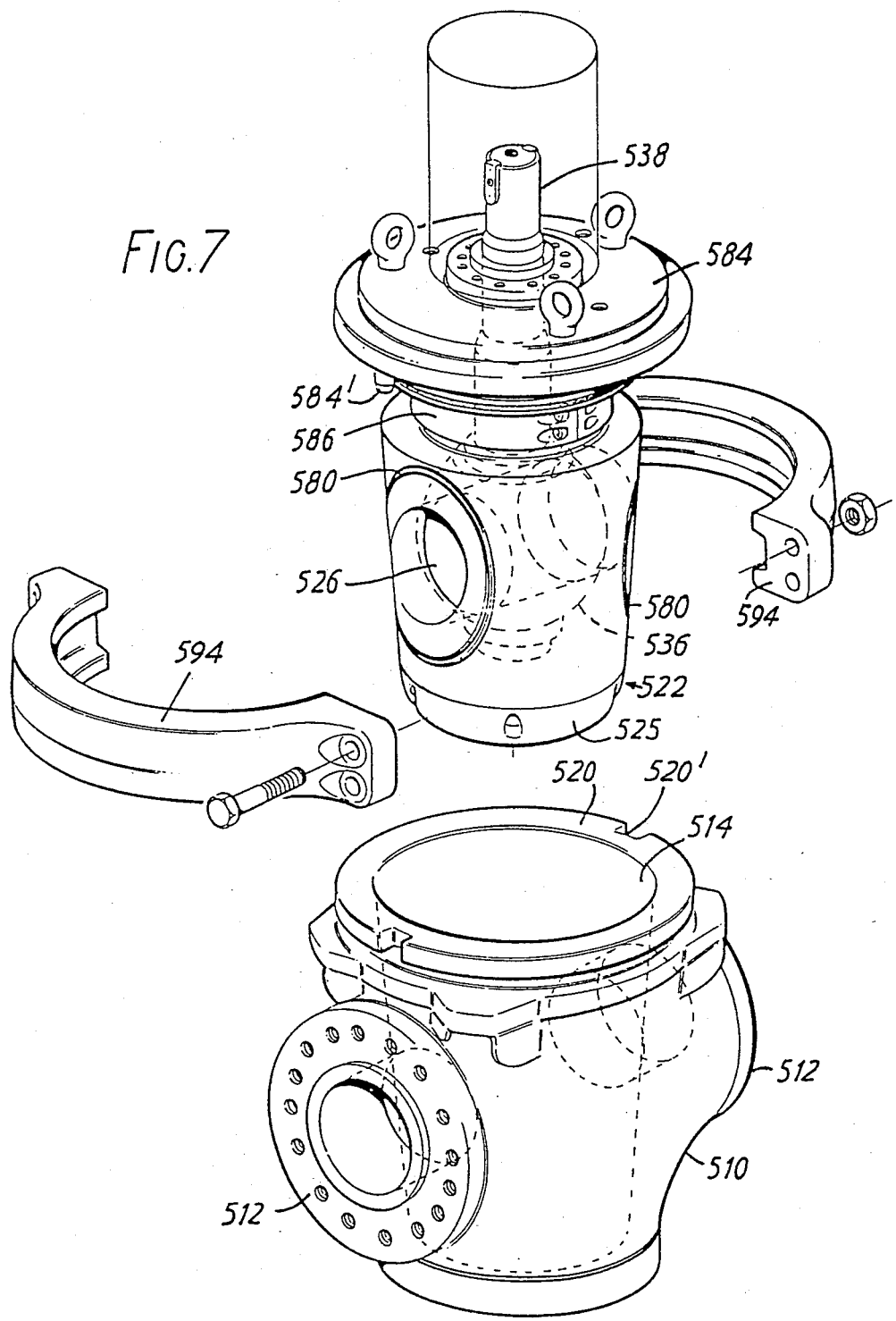
FIG. 7 is a perspective view of a second embodiment.

FIG. 7 shows a second embodiment of the invention. In essence it is the same as the first embodiment, and corresponding parts are given corresponding reference numerals raised by 500.

The body of the pipeline portion 510 has the flanges replaced by abutment surfaces 512 emerging almost directly from the conical chamber 514. This, and additional stiffening, give a very rigid construction, capable of withstanding great forces without bending. Thus servicing can be carried out reliably, even for pipelines at great depths. Internally, the conical chamber has a ceramic (e.g. alumina) coating, to avoid corrosion (e.g. due to bimetallic effects) and to provide a good mating surface for the seals 580 of the core 522. The manacle clamp 594 is separate from the body 510. Its mating surface has a coating e.g. of woven PTFE, which gives high bearing strength and insulation (preventing bimetallic corrosion). The body flange 520 has recesses 520' for receiving protrusions 584' that project beneath the bonnet 584, for ensuring correct rotational location. This is advantageous for remote assembly, by robot. The body may have docking lugs, for location of a robot vessel or tool.

The core 522 is substantially all of stainless steel. Its form is simplified, without a lower cylindrical spigot portion 25. However, the lower portion 525 has a thick plastics coating, e.g. of high density polyethylene. This protects the ceramic coating of the chamber 514 during assembly and removal, and also serves as a buffer. The halves of the core 522 may be held together by bolts and nuts in scalloped recesses, like those (30,32,28) of the first embodiment. However the bonnet 584 is secured differently: instead of bolts 86 we use a manacle clamp 586 which holds together an upper flange on the core 522 and a lower flange on the bonnet 584.

It will be appreciated that features described in connection with one embodiment may generally be combined with features from another, to suit particular circumstances. Plainly, for severe conditions it is necessary to have appropriately resistant components, e.g. a stainless steel core and all seals of PTFE. But if less is to be feared from high pressures, corrosion, sour gas and other hazards, then less expensive alternatives may be appropriate.

I claim:

1. A ball valve assembly comprising:
   (a) a ball member having a first through passage;
   (b) a core assembly within which the ball member is rotatably mounted, the core assembly having a second through passage arranged so that rotation of the ball member is effectable to move the first and second through passages selectively into and out of communication; the core assembly having external surface portions which define portions of a cone penetrated by the second through passage, and a downwardly-facing abutment surface; and
   (c) a body portion having a third through passage, the body portion being adapted for connection in a pipeline with its through passage in line with the flow passage of the pipeline; the body comprising side and bottom wall portions defining a socket for releasably receiving the core assembly, said socket having the form of a cup, being closed at the bottom by the bottom wall portion and open at the top and closed by a bonnet means, said bonnet means being attached to the core assembly and means releasably clamping the bonnet means to the body portion; at least part of the side wall portions defining the frustum of a cone complementary to the conical portions of the core assembly and penetrated by the third through passage; there being an upwardly facing abutment surface in the socket for cooperating with the abutment surface of the core assembly;

and wherein the core assembly comprises a housing for the ball memmber which housing provides bearing means in which the ball member is journalled; and wherein first seal means are provided for sealing between the ball member and the core assembly, comprising a respective annular assembly at either side of the core assembly, each annular assembly surrounding a respective opening of the second through passage and also surrounding a respective opening of the first through passage when this is in communication with the second through passage; each annular assembly having seal means for sealing to both the ball member and the core assembly, and resilient means for urging said sealing to the ball member; the core assembly having respective annular seal housing cavities in which the first seal means are housed; the core assembly further including second seal means for sealing between the core asembly and the body portion, said second seal means comprising at either axial side of the core assembly a respective sealing ring surrounding the second and third through passages; the core assembly being provided with respective sealing ring housing means for retaining the rings to it; whereby a modular unit comprising said bonnet means, said ball member and said core assembly and which provides said bearing means for the ball member and said first and second seal means is insertable into the socket of the body portion to an extent predetermined by said abutment surfaces of the core assembly and the socket, and subsequently removable therefrom as a single unit.

2. A valve assembly according to claim 1 wherein the seal means of each annular assembly of the first seal means for sealing between the ball member and the core assembly comprises a floating annular seal, attached neither to the ball member nor the core assembly, so as to be self-centering on the ball member.

3. A valve assembly according to claim 2 having camming means associated with the annular seal and the ball member arranged at least to reduce the sealing to the ball member when this is rotated from its communicating configuration.

4. A valve assembly according to claim 2 wherein the seal means are arranged to be urged by fluid pressure within the pipeline to effect sealing.

5. A method of servicing a ball valve assembly which assembly comprises:
   (a) a ball member having a first through passage;
   (b) a core assembly within which the ball member is rotatably mounted, the core assembly having a second through passage arranged so that rotation of the ball member is effectable to move the first and second through passages selectively into and out of communication; the core assembly having external surface portions which define portions of a cone penetrated by the second through passage, and a downwardly-facing abutment surface; and
   (c) a body portion having a third through passage, the body portion being adapted for connection in a pipeline with its through passage in line with the flow passage of the piepline; the body comprising side and bottom wall portions defining a socket for releasably receiving the core assembly, said socket having the form of a cup, being closed at the bottom by the bottom wall portion and open at the top and closed by a bonnet means, said bonnet means being attached to the core assembly and means releasably clamping the bonnet means to the body portion; at least part of the side wall portions defining the frustum of a cone complementary to the conical portions of the core assembly and penetrated by the third through passage; there being an upwardly facing abutment surface in the socket for cooperating with the abutment surface of the core assembly;

and wherein the core assembly comprises a housing for the ball member which housing provides bearing means in which the ball member is journalled; and wherein first seal means are provided for sealing between the ball member and the core assembly, comprising a respective annular assembly at either side of the core assembly, each annular assembly surrounding a respective opening of the second through passage and also surrounding a respective opening of the first through passage when this is in communication with the second through passage; each annular assembly having seal means for sealing to both the ball member and the core assembly, and resilient means for urging said sealing to the ball member; the core assembly having respective annular seal housing cavities in which the first seal means are housed; the core assembly further including second seal means for sealing between the core asembly and the body portion, said second seal means comprising at either axial side of the core assembly a respective sealing ring surrounding the second and third through passages; the core assembly being provided with respective sealing ring housing means for retaining the rings to it, which method comprises removing from the assembly, as a single unit, a modular unit comprising said bonnet means, said ball member and said core assembly and which provides said bearing means for the ball member and said first and second seal means and inserting, as a single unit, a like modular unit until said abutment surfaces of the core assembly and the socket abut.

* * * * *